UNITED STATES PATENT OFFICE.

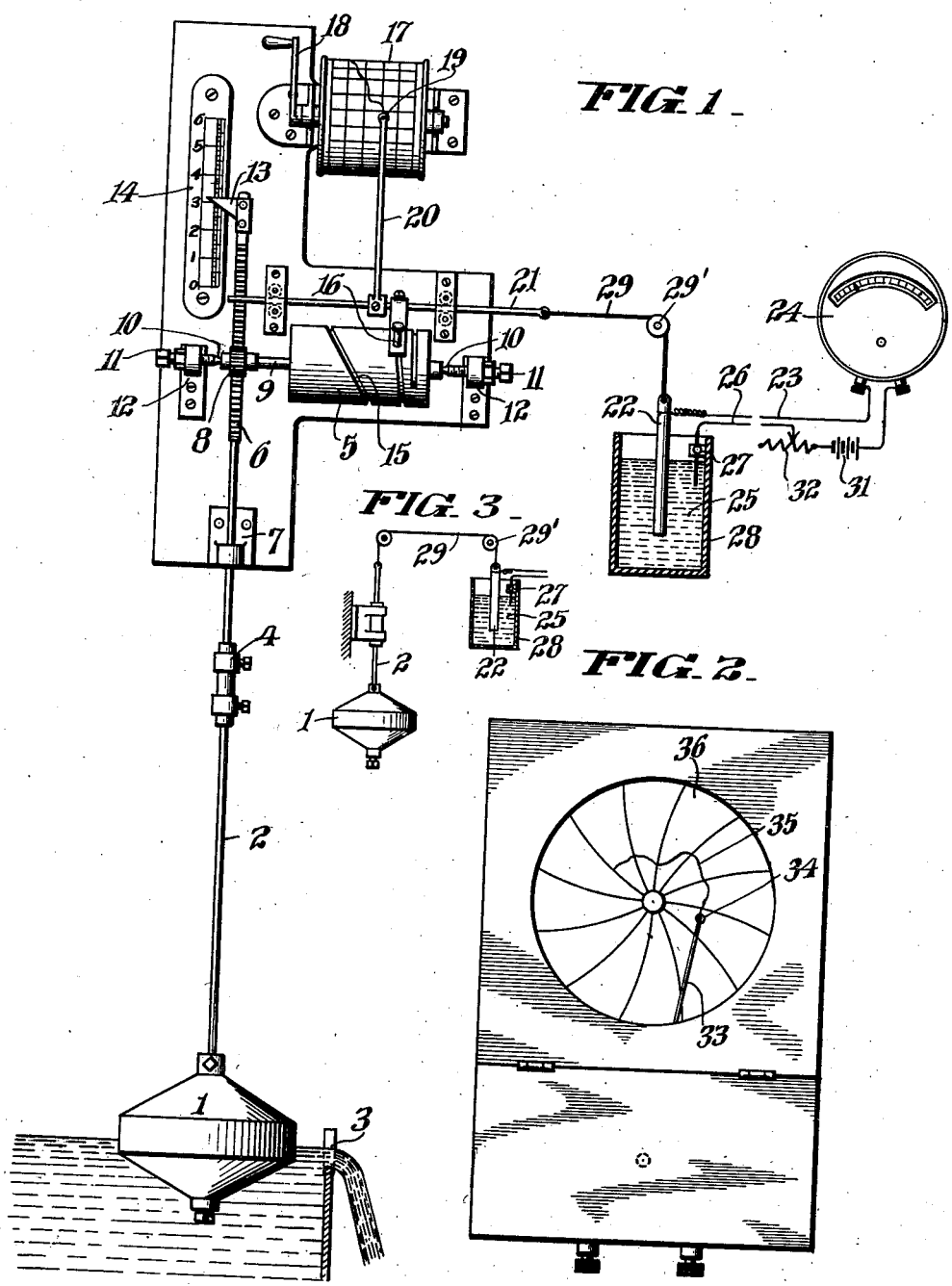

DAVID R. YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

DISTANT INDICATOR FOR FLUID-METERS.

1,200,684.  Specification of Letters Patent.  Patented Oct. 10, 1916.

Application filed November 20, 1911. Serial No. 661,240.

*To all whom it may concern:*

Be it known that I, DAVID R. YARNALL, a citizen of the United States, and a resident of Philadelphia, Pennsylvania, have invented a certain new and useful Distant Indicator for Fluid-Meters, of which the following is a specification.

The purpose of my invention is to indicate at any distance the actual quantity of fluid flowing over a weir or notch.

A further purpose of my invention is to interpose rotary transposing means between a float and a variable resistance, changing vertical movement of the float, whether proportionate to the flow or not, into straight line movement proportionate to the flow, and to operate a distant indicator by current varied by the resistance.

A further purpose of my invention is to indicate the position of the stylus of a recording drum at any desired distance therefrom.

A further purpose of my invention is to vary the depth of immersion of a resistance in a fluid conductor in proportion to the actual flow of water over a weir or notch and to use the differences in extent of immersion to correspondingly, though inversely, vary the resistance of an electric circuit.

Further purposes of my invention will appear in the specification and claims hereof.

I have preferred to illustrate my invention by that form thereof which, in practice, has proved most simple and practical and least expensive.

Figure 1 is an elevation, partly in section, of the preferred form of my invention. Fig. 2 is an elevation of a recording device which may be used. Fig. 3 is a broken partly sectional elevation of a modified form.

Similar numerals of reference indicate like parts in the drawings.

1 is a float which raises and lowers the rod 2 in proportion to the height of water passing freely over a notch or weir 3. This height need not be proportional to the quantity of flow which passes through the weir or over a notch and my invention makes it possible to indicate the flow quantitatively at a distance from the weir or notch independently of the fact in this regard and without regard to the direction or distance at which the indication is to be given.

The rod 2 is connected in any suitable manner, as at 4, with means for rotating a drum 5. The means shown is a rack 6 supported and guided suitably, as at 7, so that it may rotate the gear 8 upon the drum shaft 9. In order to secure a delicate support and adjustment, I journal the shaft upon the ends 10 of screws 11 which are adjustable in brackets 12. For purposes of local visual checking, I may supply a pointer 13 which is movable with the rack and over the scale 14. This forms no part of my invention.

Upon the drum 5 I form a guide, here shown as a groove 15, which passes about the circumference of the drum under such a law that the longitudinal movement of the coöperating guided member 16 shall be proportionate to the volume of water passing over the notch, weir or gate. If the gate be of uniform width, obviously the curve of this guide will advance according to the three halves power law, in helical form. While this *per se*, forms no part of my invention, I may obtain a local timed record of the flow by means of a clock-operated drum 17 whose winding lever is shown at 18, marking upon the drum sheet by a pen 19 moved by arm 20 in agreement with or in proportion to the movement of the rod 21 and member 16.

Starting with the float my invention includes in combination the rotatable translation mechanism, with such track or guide upon its surface as to transform the movement of the float into straight line movement of the rod 20 proportionate to the quantity of water flowing, and the corresponding variation of an electric current to give readings upon any properly calibrated ammeter or other electrical instrument proportionate to the actual water flow. One simple form of current varying device is illustrated.

The resistance 22 is connected by any suitable conductor 23 with one side of the ammeter or any other suitable electrical measuring instrument 24 and a fluid conductor 25 in which the resistance 22 is immersed, is connected to the opposite side or pole of the ammeter or other instrument by a conductor 26 supported as at 27. The conductors, resistance and container 28 have been conventionally shown. I have connected the rod 20 and conductor 22 by a simple cord connection 29 passed about a pulley 29', depending upon the weight of the resistance to insure the immersion of the resistance 22 proportionately to the movement of the rod 20. Obviously, the maximum free part of the resistance 22 may represent any desired proportion of the entire resistance of the circuit and the current caused by the battery 31 may be as nearly proportionate to the movement of the rod 20 as may be required, the approximation being close as the resistance of 22 approximates the entire resistance in the circuit containing battery 31. Where the portion of the resistance 32 included within the circuit is very high, the current flow between the limits of movement of the resistance 22 will also be closely proportionate to the movement of the resistance 22. This proportion, however, cannot be strictly true, but the instrument can be specially calibrated for a given total resistance of the circuit and the adjustable resistance 32 may be inserted in the circuit and varied in individual installations to bring the total outside resistance up to that for which the instrument has been calibrated.

In Fig. 2 I show a recording arm 33 caused to oscillate by any suitable electrical measuring apparatus so that its pen 34 will trace a curve 35 proportionate in its distance from the center of the disk 36 to the flow of the water of the weir. As is usual in these instruments, the time element is represented by the rate of rotation of the disk.

In operation, the float rises and falls with the height of water, which may or may not agree with the rate of flow over the weir or notch. The rod 2 and rack 6 cause rotation of the drum 5 in agreement with the water height. Any variation of the rate of water flow from the rate of rise of water is taken care of by the character of the curve upon the circumference of drum 5, so that rod 21 is given straight line movement in proportion to the water flow. The indicator 13 and recording mechanism 17 are intended for local use and do not affect the movement of the rod 21, nor the distant indication by my invention. Under the conditions stated, the current flowing in the circuit may be made nearly inversely proportionate to the amount of rod resistance exterior to the immersing bath. Where the resistance of the exterior circuit is high, the range of readings represented on the instrument will of course represent but a part of the movement of the needle if it were free to move the full distance corresponding to the current. The variation from movement truly proportionate to the rod movement, may readily be taken care of by calibration of the meter or other indicator used and may be made negligible where either the external resistance or the resistance of the rod is relatively high with respect to the other.

In Fig. 3 I have shown a very simple form of my invention in which the float is more directly connected to the resistance 22 and moves at the same rate, though in an inverse direction. The current through the indicating instrument would be in direct, rather than inverse proportion to the change of flow of the fluid measured and the instrument would require calibration. The flexible connector 29 here passes about two pulleys and there is no intermediate rotating member. Since the flow of the water will increase at a more rapid rate than the height of the water, in a relation thereto indicated by the 3/2 or 5/2 power, for the rectangular and V openings, respectively, it will be necessary to have the indicating instrument calibrated to give readings in agreement with the flow. The resistance 32 may be used to equalize slight variation of the battery resistance as well as for initial compensation of resistance in agreement with the conditions of instrument calibration.

By my construction I obtain a plurality of indicating or recording mechanisms actuated by the same float, and I have selected mechanisms which operate in different ways and are not open to the same deficiencies and weaknesses. I also attain a distant check upon the local indicator or recorder, which is quite useful, for example in protecting against attempted increase in the showing of evaporation possible at the local indicator or recorder, where the supply of feed water which is being evaporated in boilers is being measured.

Having thus described my invention, what I claim as new and desire to secure by Letters Patent is:—

1. In a device of the character stated, a weir, a float therefor, a rod operated by the float, translating mechanism for causing right line movement proportionate to the flow of fluid over the weir, an electric resistance, means for varying the resistance, operative connections between the translating mechanism and said means, a source of electromotive force and an electric measure in the same circuit with the resistance and the source of electromotive force.

2. In a device of the character stated, a float, movable variantly to the changes in rate of water flow, a drum rotated because of the movement of the float, a guide upon the drum correcting the variation in the movement of the float, a resistance varied in proportion to the water flow and moved by the guide, an electric measuring instrument, an electric circuit through the resistance and instrument and an adjustable external resistance in the circuit.

3. In a device of the character stated, a float, a mechanically operated measure therefor, float actuated connections operating said measure, an electrically operated measure and float actuated connections varying the reading of the electrically operated measure, both measures being calibrated to read in quantity of water flow.

4. In a device of the character stated, a float, separate mechanical and electrical means for indicating the flow to which the position of float corresponds, both calibrated to read in different proportion from the proportion of movement of the float and connections between the float and each of said means, part of the connections being common to both.

DAVID R. YARNALL.

Witnesses:
HELEN I. KAUFFMAN,
WM. STEELL JACKSON.